J. H. McLean.

Sheet 1, 2 Sheets.

Dredger.

No. 2,853. Reissued Feb. 4, 1868.

Witnesses:

Timothy Bourne

Edward F. Flint

Inventor:

James H McLean

By his Atty

Amos Burnham

N. PETERS, PHOTO-LITHOGRAPHER, WASHINGTON, D. C.

Sheet 2, 2 Sheets.

J. H. McLean.

Dredger.

No. 2,853. Reissued Feb. 4, 1868.

Witnesses:

Edward P. Flint,

Inventor:

Thos. H. McLean
By his Attorney
Amos Bonding

UNITED STATES PATENT OFFICE.

JAMES H. McLEAN, OF ST. LOUIS, MISSOURI.

IMPROVED DREDGING-MACHINE.

Specification forming part of Letters Patent No. 66,608, dated July 9, 1867; Reissue No. 2,853, dated February 4, 1868.

*To all whom it may concern:*

Be it known that I, JAMES H. McLEAN, of St. Louis, in the county of St. Louis and State of Missouri, have invented a new and useful Improved Dredging-Machine, of which the following is a full, clear, and exact description, reference being had to the annexed drawings, making a part of this specification, in which—

Figure 1:
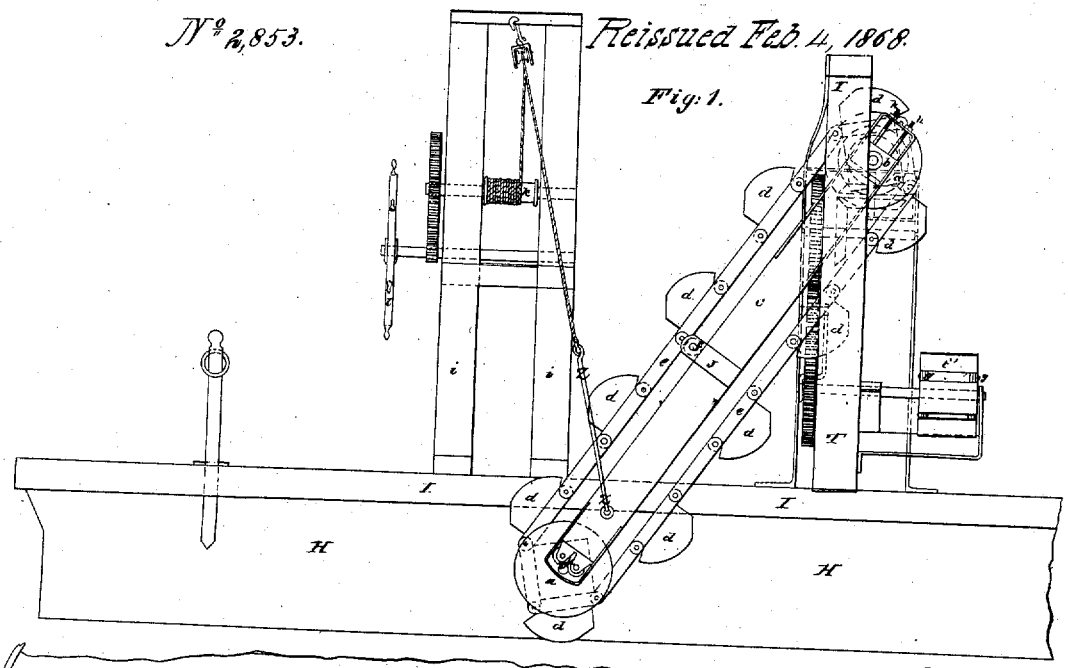
Figure 2:
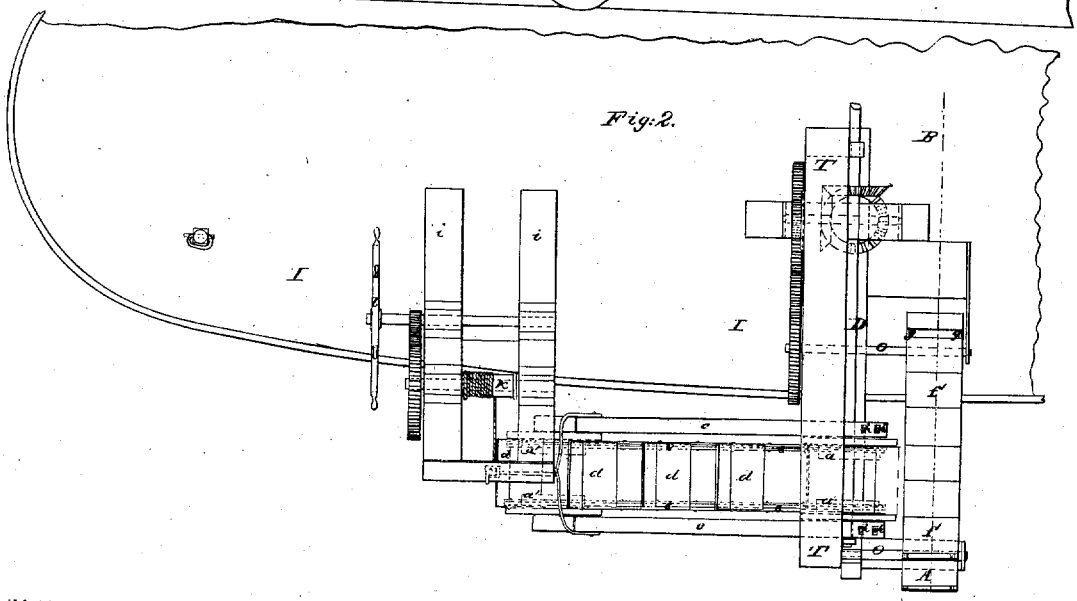
Figure 3:
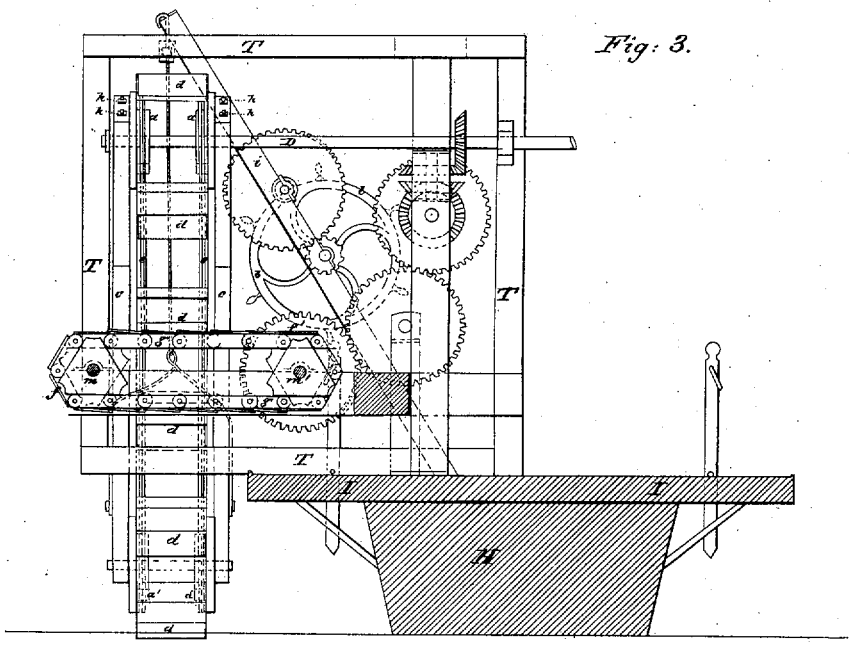

Figure 1 represents a side elevation of my invention. Fig. 2 represents a plan or top view of the same with one side of the deck of the boat broken off. Fig. 3 represents a transverse section, taken on the line A B of Fig. 2, showing also a rear elevation of my invention.

Similar letters indicate like parts.

The object of my invention is to produce a dredging-machine completely under the control of the operator, and which may be readily adjusted to dredging at different depths.

My machine is designed to be placed on a steamboat-hull or other vessel of ordinary construction; and it consists of a frame, T, Figs. 1, 2, and 3, carrying the main driving-shaft D, the upper or "power" end of the dredging-frame C, and the chain *e*, to which are attached the scoops or buckets *d*.

The shaft D, it will be seen, is arranged in suitable bearings near the upper part of the frame T, and serves as a center upon which the dredging-frame swings, the frame T being made to project far enough over the side of the deck to allow the dredging-frame to swing clear of the vessel, as clearly shown in Figs. 2 and 3.

My dredging-frame C is constructed of two parallel timbers of sufficient length to enable the lower end of the same to reach the point of excavation, and consequently their length will be determined by experience and the nature of the work to be done. At the upper end of this frame are placed two square driving-wheels, *a a*, having flanges to prevent the chain from running off, and also two wheels, *a′ a′*, of the same construction, at the lower end. Passing over these wheels are two endless chains, *e e*, whose links match the squares of the wheels *a a a′ a′*, and each alternate link bears a bucket or scoop, as shown in Fig. 1. These buckets or scoops are of novel construction, their side plates being convex above the plane of the nose and cutting-edge, as represented by the dotted line *x*, Fig. 1. The edge of these plates, being thin and sharp, makes two parallel cuts about six inches deep in advance of the horizontal cutting-edge of the scoop, (shown at *w*, Fig. 1,) so that if, for instance, the excavation be made in clay or other hard material the scoop will cut the same into blocks, thus saving the great strain that is brought on the machine when ordinary buckets are used. Should there be snags or sticks mixed with the earth, this construction of the buckets will prevent them from being torn by the same, as they will be effectually broken up by the parallel cutting-edges before they can do any injury to the main bucket.

The dredging-frame C is made adjustable upon the main shaft D by means of an adjusting-bearing, *b*, upon which the dredging-frame moves, and such adjustment is controlled by the screws *h h*. I can by means of this arrangement bring any desired degree of tension upon the chain *e e*. The bearings at the lower end of the dredging-frame in which the wheels *a′ a′* revolve are rendered comparatively frictionless by the four friction-wheels, two of which are shown in Fig. 1. A strong iron strap passing over the journal of the wheels prevents the journal from losing its contact with the friction-wheels, as shown.

To regulate the dip of the dredger, and to raise and lower the scoops to and from their work, there is a derrick constructed of any known form, and fitted with suitable gearing and hoisting-drum. (Shown at *l* and *k*, Figs. 1 and 2.) There is a rope or fall passing through suitable tackle at the top of the derrick and connected with a yoke attached to the dredging-frame, as shown at *z*, Fig. 1, while the other end is wound around the hoisting-drum above named. To still further add to the well-working of my machine, I attach thereto a receiver and discharger constructed as follows: It consists of two endless chains, similar in construction to the dredging-chains, bearing upon their surface broad plates of iron, the edges of which lap slightly over each other, as shown at *f′*, Fig. 3, thus forming an endless apron to receive the dredgings, and, by its continuous motion, carry the same over the side of the vessel to the place of deposit. The power to operate this apron is conveyed from the main shaft by means of suitable gearing, as shown in Fig. 3. Although I regard this apron as a most useful adjunct to my machine when working in certain situations, yet it is not by any means absolutely essential to the perfect working of same, since the dredgings may be easily disposed of by the use of an ordinary trough or chute. Now, to anchor or moor the vessel securely at any given point, through holes in the guard-deck of the vessel I insert pins L, fitted with rings to work them with, and pins to keep them up when raised out of the mud or sand, as shown by the drawings. I do not limit myself to any specified number of pins, but shall use as many as are necessary to secure the desired end.

The advantages of my dredger over those heretofore used are: first, the construction of the dredging-frame C so that the buckets can be steadily held to the bottom of streams having a swift and powerful current; second, the adjustability of the dredging-frame to suit different depths, and, by raising the same entirely out of the water, facilitating the movement from one position to another of the boat carrying the machine; third, the power of depositing the dredgings wherever desired by means of the endless apron; and, lastly, the facility with which the same may be moored by means of the pins, thus doing away with anchors or other devices commonly relied upon.

I do not claim to be the first inventor of the method of attaching scoops to an endless chain in a dredging-machine; nor of the employment of the endless apron described for the purpose of carrying away the work of a machine, since this is used in other machines—as a brick-machine, for instance; nor of the method of hanging the dredger over the side of the vessel upon which it is placed; but What I do claim as my invention, and desire to secure by Letters Patent, is—

1. The adjustable dredging-frame C, when such adjustment is produced by a derrick, *i i*, and fall, when constructed and operated substantially as shown and specified.

2. The scoops *d* of a dredging-machine, having circular vertical cutting-edges in advance of the usual lateral cutting-edge *w*, Fig. 1, when constructed and operating substantially as shown and specified.

3. In combination with the dredging-vessel, the pins L, for the purpose of mooring the same, substantially as described.

4. The dredger, the receiving and discharging apron, and the derrick of a dredging-machine, all in combination, when constructed and operated substantially as shown and specified.

J. H. McLEAN.

Witnesses:
SAML. S. BOYD,
HENRY T. CARTER.